United States Patent [19]

Moriyama et al.

[11] Patent Number: 5,322,877
[45] Date of Patent: Jun. 21, 1994

[54] TERNARY RESIN COMPOSITION AND PRODUCTION THEREOF

[75] Inventors: Takamasa Moriyama; Hiroki Masumoto, both of Takatsuki; Kiniyasu Kato, Joyo; Mitsuo Shibutani, Hirakata, all of Japan

[73] Assignee: Nippon Gohsei Kagaku Kogyo Kabushiki Kaisha, Osaka, Japan

[21] Appl. No.: 29,408

[22] Filed: Mar. 10, 1993

[30] Foreign Application Priority Data

Mar. 13, 1992 [JP] Japan .................................. 4-89698

[51] Int. Cl.$^5$ .............................................. C08K 5/09
[52] U.S. Cl. .................................... 524/399; 524/400
[58] Field of Search .................... 525/57; 524/399, 400

[56] References Cited

U.S. PATENT DOCUMENTS 4,877,662 10/1989 Yazaki et al. ...................... 428/515
5,118,743 6/1992 Yonezu et al. ...................... 524/400

FOREIGN PATENT DOCUMENTS 62-68840  3/1987 Japan .
62-152847 7/1987 Japan .
62-177047 8/1987 Japan .

Primary Examiner—Veronica P. Hoke
Attorney, Agent, or Firm—Armstrong, Westerman, Hattori, McLeland & Naughton

[57] ABSTRACT

A resin composition including (A) a saponified ethylene-vinyl acetate copolymer having an ethylene content of 20 to 60 mole percent and a saponification degree of not less than 90 mole percent, (B) a polyolefin resin, (C) a carboxylic acid-modified polyolefin resin and (D) a lower fatty acid alkaline earth metal salt, characterized in:

that the proportion of (A) relative to the total amount of (A) plus (B) plus (C) is 0.3 to 0.7 on the weight basis;

that the composition contains the carbonyl group in an amount of 0.002 to 0.05 equivalent per 100 grams of the total of (B) plus (C); and that the equivalent ratio between (D) and the carbonyl group in (C) is 0.5 to 5, and a method of producing the resin composition are provided.

2 Claims, No Drawings

TERNARY RESIN COMPOSITION AND PRODUCTION THEREOF

FIELD OF THE INVENTION

The present invention relates to a resin composition comprising a saponified ethylene-vinyl acetate copolymer (hereinafter briefly referred to as "EVOH") and a polyolefin based polymer alloy and to a method of producing the same.

PRIOR ART

Polymer blends comprising EVOH and a polyolefin resin have so far been used in manufacturing such shaped articles as various films and containers where the characteristic properties of both polymers, for example the gas barrier property of EVOH and the moldability, stretchability and crack resistance of the polyolefin resin, are highly valued.

However, said blends, which are binary compositions, have confronted new problems in the molding step and from the physical property viewpoint. Attempts have recently been made to solve these problems by incorporating into EVOH an alkaline earth metal compound and a modified polyolefin resin.

Thus, for instance, Japanese Kokai Tokkyo Koho No. 62-68840 proposes incorporation of a carboxylic acid-modified thermoplastic resin and an alkaline earth metal oxide or higher fatty acid salt into EVOH for the purpose of improving the gelation behavior and prevent discoloration and, further, gas barrier property deterioration in the step of molding. Said fatty acid salt includes alkaline earth metal salts of saturated or unsaturated fatty acids containing 10 to 26 carbon atoms, such as palmitic acid, myristic acid, stearic acid, oleic acid, linolic acid, linolenic acid, tallow fatty acids, coconut fatty acids, palm oil fatty acids and the like, in particular magnesium salts of such higher fatty acids.

According to Japanese Kokai Tokkyo Koho No. 62-152847, a carboxylic acid-modified ethylene copolymer containing a metal hydroxide or salt, for example an alkaline earth metal hydroxide or salt, is incorporated into EVOH to be used for forming an intermediate layer of EVOH laminates for the purpose of improving the flexural fatigue resistance and gas barrier property of said laminates. Furthermore, according to Japanese Kokai Tokkyo Koho No. 62-177047, a carboxylic acid-modified ethylene copolymer containing a metal hydroxide or salt, for example an alkaline earth metal hydroxide or salt, is incorporated into a saponified ethylene-vinyl acetate copolymer and a hydrophobic thermoplastic resin for the purpose of improving the uniformity and moldability or processability of the EVOH-polyolefin resin composition. Examples of the alkaline earth metal hydroxide or salt as described in the above-cited patent specifications are sodium carbonate, lithium carbonate, magnesium carbonate, sodium acetate, sodium hydroxide, potassium hydroxide, calcium hydroxide, magnesium hydroxide and the like, and the addition level is 0.02 to 0.3 equivalent relative to the carboxylic acid or carboxylic acid anhydride moiety in the ethylene copolymer.

However, investigations made by the present inventors revealed that the above-mentioned prior art technology encounters a new problem in that as the proportion of the polyolefin resin or carboxylic acid-modified polyolfein resin relative to EVOH increases, the EVOH composition shows a tendency toward retention in the die in the step of molding, so that the so-called self-purging property becomes worse.

In processing EVOH compositions, it is often necessary to discontinue the molding process for resin type change or for reasons of business management and restart the molding several hours later or, in certain instances, several days later. In such case, it is required in the prior art to pass the polyolefin resin through the molding machine for cleaning the machine inside in advance of restarting the melt molding of an EVOH composition.

However, this procedure is too troublesome. If the melt molding could be restarted by reheating alone in the presence of an EVOH composition remaining in the extruder, much advantage would be obtained. With the prior art EVOH compositions, however, a fairly long time is required until shaped articles of standard quality can be obtained after the restart of melt molding. The material loss is also great. It is an urgent task to solve these problems. Furthermore, the prior art EVOH compositions are still unsatisfactory in another respect; when molded into shaped articles, they are liable to discoloration.

The present inventors made elaborate investigations concerning the best kind of alkaline earth metal salts and the addition level therefor and, as a result, found that when at least one of alkaline earth metal salts of a specific kind is added in an amount within a specific range, shaped articles or moldings can be obtained with good self-purging, without discoloration and without impairing the properties characteristic of EVOH-polyolefin resin compositions (flexural fatigue resistance, stretchability, gelation-preventing property, compatibility, shock resistance, flexibility, gas barrier property, etc.). Based on this new finding, the present invention has been completed.

SUMMARY OF THE INVENTION

Thus, the invention has solved the above problems by providing a resin composition comprising (A) EVOH with an ethylene content of 20 to 60 mole percent and a saponification degree of not less than 90 mole percent, (B) a polyolefin resin, (C) a carboxylic acid-modified polyolefin resin and (D) an alkaline earth metal salt of a lower fatty acid, characterized in:

that the proportion of (A) EVOH relative to the total amount of (A) EVOH+(B) polyolefin resin+(C) carboxylic acid-modified polyolefin resin is 0.3 to 0.7 on the weight basis;

that the composition contains the carbonyl group in an amount of 0.002 to 0.05 equivalent per 100 grams of the total of (B) polyolefin resin+(C) carboxylic acid-modified polyolefin resin; and that the equivalent ratio between (D) the lower fatty acid alkaline earth metal salt and the carbonyl group in (C) carboxylic acid-modified polyolefin resin is 0.5 to 5.

DETAILED DESCRIPTION OF THE INVENTION

In the following, the invention is described in further detail. The components (A) EVOH, (B) polyolefin resin, (C) carboxylic acid-modified polyolefin resin and (D) lower fatty acid alkaline earth metal salt are sometimes referred to as (A), (B), (C) and (D), respectively, for short and the proportions of these components in the composition as A, B, C, D, respectively.

The EVOH (A) to be used in the practice of the invention has an ethylene content of 20 to 60 mole percent, preferably 25 to 55 mole percent, a melt index (as measured at 210° C. under a load of 2,160 g) of 1 to 100 g/10 minutes, preferably 3 to 50 g/10 minutes, and a degree of saponification of not less than 90 mole percent, preferably not less than 99 mole percent.

When the ethylene content is below the above range, the molding temperature is close to the decomposition temperature, so that molding is difficult.

When said content is beyond the above range, the gas barrier property shows a tendency toward decrease. When the melt index is below the above-specified range, a high-torque state is brought about in the extruder inside in the step of processing, rendering the processing difficult while, conversely, when the melt index exceeds the above-mentioned range, the extrusion processability becomes unstable due to the resulting low-torque condition. When the degree of saponification is smaller than the lowest limit mentioned above, the gas barrier property will be unsatisfactory.

The polyolefin (B) to be used in the practice of the invention includes, but is not limited to, polyolefins such as very-low-density polyethylene, (linear) low-density polyethylene, high-density polyethylene and polypropylene, and olefin-based copolymers such as ethylene-vinyl acetate copolymers and ethylene-ethyl acetylate copolymers, each having a high ethylene content.

The carboxylic acid-modified polyolefin (C) to be used in the practice of the invention is a modification of a polyolefin resin selected from among those mentioned above as (B) as derived by copolymerization or graft modification with a carboxylic acid. Said carboxylic acid includes, among others, maleic acid, acrylic acid, itaconic acid, crotonic acid, maleic anhydride and itaconic anhydride. Among these, maleic anhydride is particularly preferred. For practical purposes, the carboxylic group content is preferably about 0.002 to 0.2 equivalent per 100 g of the carboxylic acid-modified polyolefin resin (C).

The lower fatty acid moiety of the lower fatty acid alkaline earth metal salt (D) to be used in the practice of the invention is derived from a lower fatty acid containing not more than 9 carbon atoms, normally not less than 6 carbon atoms, preferably not more than 4 carbon atoms, such as formic acid, acetic acid, propionic acid, lactic acid or citric acid. The alkaline earth metal is, for example, magnesium, barium or calcium. Typical examples of said salt are thus magnesium acetate, magnesium formate, calcium acetate, barium acetate, magnesium propionate, calcium propionate, magnesium lactate and the like. Particularly preferred among these are magnesium acetate, calcium acetate and magnesium propionate.

In accordance with the invention, it is essential for the proportions of the components (A) EVOH, (B) polyolefin resin and (C) carboxylic acid-modified polyolefin resin to be such that the ratio A/[A+B+C] is within the range of 0.3 to 0.7 (on the weight basis), preferably 0.4 to 0.6 (on the weight basis). When said ratio is below the range mentioned above, the shock resistance, flex crack resistance, stretchability and thermoformability will not be improved to a satisfactory extent. Conversely, when said ratio exceeds the above range, the EVOH matrix formation becomes unstable and matrix reversion tends to occur, so that constant physical properties cannot be obtained any longer.

As regards the proportions of (B) and (C), it is necessary that the carbonyl group in [(B)+(C)] should amount to 0.002 to 0.05 equivalent, preferably 0.004 to 0.02 equivalent, per 100 g of the resins [(B)+(C)]. When the carbonyl group content is below the above range, the compatibility between EVOH (A) and these polyolefin resins will be insufficient, hence the formation and maintenance of a stable matrix of EVOH (A) will be difficult. When the carbonyl group content exceeds the above range, films produced from the composition will have a rough surface, hence an unsatisfactory appearance, and, at the same time, intense discoloration may occur, worsening the appearance.

Finally, the content of the lower fatty acid alkaline earth metal salt (D) is defined by the equivalent ratio of the lower fatty acid alkaline earth metal salt (D) to the carbonyl group in the carboxylic acid-modified polyolefin resin and said ratio should be within the range of 0.5 to 5, preferably 1 to 2. When such equivalent ratio of (D) is below the above range, the self-purging property of the composition in the step of extrusion molding is sacrificed and, conversely, when said ratio is beyond the above range, the variation in melt viscosity difference as resulting from the difference in the retention time distribution of the composition is so great in the step of molding and processing that shaped articles uniform in thickness distribution cannot be obtained or, in other words, the object of the invention cannot be accomplished.

The resin composition of the invention may contain various additives conventionally used in thermoplstic resins for ordinary molding purposes.

As said additives, there may be mentioned, among others, antioxidants, ultraviolet absorbers, plasticizers, antistatic agents, lubicants, colorants and fillers. These can be incorporated in said composition each at an addition level at which the effects of the invention will not be spoiled.

More specifically, there may be mentioned, as antioxidants, 2,5-di-tert-butylhydroquinone, 2,6-di-tert-butyl-p-cresol, 4,4'-thiobis(6-tert-butyl-3-methylphenol), 2,2'-methylenebis(4-methyl-6-tert-butylphenol), tetrakis[methylene-3-(3',5'-di-tert-butyl-4'-hydroxyphenyl)propionato]methane, octadecyl 3-(3',5'-di-tert-butyl-4'-hydroxyphenyl)propionate, 4,4'-thiobis(6-tert-butylphenol) and the like.

As ultraviolet absorbers, there may be mentioned ethyl 2-cyano-3,3-diphenylacrylate, 2-(2'-hydroxy-5'-methylphenyl)-5-chlorobenzotriazole, 2-(2'-hydroxy-3'-tert-butyl-5'-methylphenyl)-5-chlorobenzotriazole, 2-hydroxy-4-methoxybenzophenone, 2,2'-dihydroxy-4-methoxybenzophenone, 2-hydroxy-4-octoxybenzophenone, etc.; as plasticizers, dimethyl phthalate, diethyl phthalate, dioctyl phthalate, waxes, liquid paraffin, phosphate esters, etc.; as antistatic agents, pentaerythritol monostearate, sorbitan monopalmitate, sulfated oleic acid, polyethylene oxide, Carbowax (polyethylene glycol), etc.; as lubricants, ethylenebisstearamide, butyl stearate, calcium stearate, zinc stearate, etc.; as colorants, carbon black, phthalocyanine pigments, quinacridone pigments, indoline pigments, azo pigments, titanium oxide, iron oxide red, etc.; and, as fillers, glass fiber, mica, wollastonite, etc.

Furthermore, an appropriate amount of any of various other thermoplastic resins may be incorporated. As such other thermoplastic resins, there may be mentioned polyolefins other than (B), modified polyolefins derived from said polyolefins by graft modification with an unsaturated carboxylic acid or a derivative thereof, polyamides, polyesters, polystyrene, polyacrylonitrile, polyurethanes, polyacetal, polycarbonate, melt-moldable polyvinyl alcohol resins, and the like.

The resin composition of the present invention can be produced in the following manner. The means or apparatus to be used in mixing up the components of the resin composition is not limited to any particular species but may be a conventional mixing machine known in the art, such as a twin-screw extruder.

In producing the resin composition of the invention, it is desirable to mix and melt, by the melt side feed or solid side feed technique, a member belonging to the group (1) mentioned below and a member belonging to the group (2) mentioned below.

Group (1)
  Member (1a): A mixed melt composed of (A) and (D)
  Member (1b): A single melt of (A) and a single melt of (D)
  Member (1c): A single melt of (A) and a solid of (D)

Group (2)
  Member (2a): A mixed melt composed of (B) and (C)
  Member (2b): A mixed solid composed of (B) and (C)

Among the possible combinations, the combination of member (1a) and member (2a) is particularly preferred. The combination of member (1a) and member (2b) is also preferred.

Said melt side feed technique comprises melting and mixing one component of a resin composition with the other component maintained in a molten state, followed by molding. In a typical example, (A) and (D) are heated, melted and mixed in a twin-screw extruder at a melt temperature of about 180° to 250° C. and then a mixed melt composed of (B) and (C) as prepared by heating, melting and mixing at a melt temperature of 180° to 280° C. is fed to said twin-screw extruder through a side feed opening thereof, followed by kneading to give a uniform composition. This technique is particularly useful when the viscosity difference between [(A)+(D)] and [(B)+(C)] is great.

The solid side feed technique comprises adding a low-melting component, in solid state, of a resin composition to a high-melting component maintained in a molten state, followed by melting and mixing. In a typical example, (A) and (D) are heated and melted in a twin-screw extruder at a melt temperature of about 180° to 280° C. and then a mixed solid prepared in advance by dry blending of (B) and (C) or by separately mixing and melting (B) and (C) and pelletizing or pulverizing the resulting mixture is fed to said twin-screw extruder through a side feed opening thereof via a dosing feeder, followed by kneading in said extruder to give a uniform composition.

In preparing the molten mixture of (A) and (D) for submission to such production methods as mentioned above, it is desirable that (A) and (D) be subjected to dry blending and then converted into a mixed melt. It is also possible to add (D) to (A) in molten state to give a mixed melt.

As already mentioned hereinabove, (A) and (D) may be added individually. Thus, for example, it is possible to add a mixed melt or mixed solid composed of (B) and (C) to (A) in molten state and then add (D) for mixing and melting.

The manner and time of addition of each of the various additives mentioned above are not critical provided that the effects of the invention are not damaged thereby.

The molding of the composition obtained in the above manner into films by T-die extrusion or inflation extrusion, for instance, even after interruption for business management reasons, can be restarted by merely heating the molding material to about 190° to 250° C., whereby quite pretty shaped articles free of any streak, foreign matter or like defect can be obtained within 30 minutes.

The resin composition thus provided by the present invention can be used for producing various shaped articles or moldings, such as pellets, films, sheets, containers, fibers, rods, tubes and the like, following melting and kneading. The pellets, or ground products derived from such moldings (in the case of recovery and recycling, for instance) can be subjected again to melt molding.

As the method of melt molding, extrusion molding (T-die extrusion, inflation extrusion, blow molding, melt spinning, profile extrusion, etc.) and injection molding techniques are mainly used. In most instances, the melt molding temperature is selected within the range of 170° to 270° C. The melt molding includes injection blow molding and can give shaped articles with good dimensional accuracy.

It is of course possible to combinedly use two or more EVOH (A) species differing in ethylene content and/or degree of saponification for melt molding.

In addition to the additives mentioned above, other stabilizers, surfactants, crosslinking substances (epoxy compounds, polyvalent metal salts, inorganic or organic polybasic acids or salts thereof, etc.), fibers (glass fibers, carbon fibers, etc.) as reinforcements, hydrotalcite, and the like can be incorporated each in an appropriate amount for melt molding.

The resin composition of the invention is useful not only in producing single-layer shaped articles solely composed of said resin composition, as mentioned above, but also in producing laminated structures which contain at least one layer composed of said composition and are suited for practical use in many instances.

For producing said laminated structures, another base material is laminated to one or both sides of a layer of the resin composition obtained in accordance with the invention. As the method of lamination, there may be mentioned, for example, the method comprising melt-extruding a thermoplastic resin on a film or sheet of said composition, the method comprising melt-extruding contrariwise said composition on a base material such as a thermoplastic resin, the method comprising coextruding said composition and another thermoplastic resin and, further, the method comprising laminating a film or sheet of the resin composition of the invention to a film or sheet of another base material by means of a per se known adhesive, such as an organic titanium compound, an isocyanate compound or a polyester compound.

As the partner resin to be used in coextrusion includes, there may be mentioned, among others, polyolefin resins in a broad sense of the term, including olefin homopolymers and copolymers, such as linear low-density polyethylene, low-density polyethylene, medium-density polyethylene, high-density polyethylene, ethylene-vinyl acetate copolymer, isomers, ethylenepropylene copolymer, ethylene-acrylate ester copolymers, polypropylene, propylene-α-olefin (α-olefin containing 4 to 20 carbon atoms) copolymers, polybutene and polypentene, and modifications of such olefin homopolymers and copolymers as graft-modified with an unsaturated carboxylic acid or an ester thereof, polyesters, polyamides, copolymerized polyamides, polyvinyl chloride, polyvinylidene chloride, acrylic resins, styrenic resins, vinyl ester resins, polyester elastomers, polyurethane elastomers, chlorinated polyethylene, chlorinated polypropylene, and the like. Saponified ethylene-vinyl acetate copolymers are also coextrudable.

In laminating another base material to films, sheets or the like produced from the resin composition of the invention by extrusion coating or laminating such films, sheets or the like to films, sheets or the like made of another base material by means of an adhesive, it is further possible to use any optionally selected base materials (paper, metal foils, uniaxially or biaxially stretched plastic films or sheets, woven fabrics, nonwoven fabrics, metal wires, wooden surfaces, etc.) other than the above-mentioned thermoplastic resins.

If a layer of the composition of the invention is expressed as X ($X_1$, $X_2$, ...) and a layer of another base material, for example a thermoplastic resin as Y ($Y_1$, $Y_2$, ...), the laminated structures, when they are film-like, sheet-like or bottle-like, can have not only the two-layer structure X/Y but also any of arbitrary combination structures, such as Y/X/Y, X/Y/X, $X_1/X_2/Y$, X/$Y_1$/$Y_2$, Y/X/Y and $Y_2/Y_1/X/Y_1/Y_2$. When they are filament like, such arbitrary combinations of X and Y are possible as bimetal type, core (X)-sheath (Y) type, core (Y)-sheath (X) type, and eccentric core-sheath types.

In the case of coextrusion, the resin used as Y or a resin used in Y may be blended into X or a resin used in X may be blended into Y, or a resin capable of improving the adhesion between layers may be incorporated into at least one of X and Y.

The laminated structures may have any shape and form. Examples are films, sheets, tapes, bottles, pipes, filaments and profile extrudates.

The laminated structures obtained may be subjected, as necessary, to heat treatment, cooling treatment, rolling treatment, printing treatment, dry lamination treatment, solution or melt coating treatment, bag making processing, deep draw processing, box making processing, tube making processing, or splitting processing, for instance.

When necessary, the shaped articles or laminated structures mentioned above may be subjected to stretching for improving their physical properties.

Thus, the resin composition of the invention may be melt-molded into a raw film. The film thickness is not critical but may be selected within the range of several micrometers to several hundred micrometers, for instance. The term "film" as used herein broadly includes films in the form of sheets, tapes, tubes, containers and the like as well.

Such film has a uniform thickness and has a very high commercial value. Such film thickness stability can be maintained even when molding processing is continued over a long period of time.

The film obtained in the above manner can be subjected to stretching or orientation after moisture conditioning, for example humidification or drying, as necessary.

The stretching or orientation may be uniaxial or biaxial. Draw ratios as high as possible are preferred from the physical properties viewpoint. In the case of uniaxial stretching, the draw ratio should preferably be not less than 1.5, more preferably not less than 2. In the case of biaxial stretching or orientation, the areal draw ratio should preferably be not less than 1.5, more preferably not less than 2, most preferably not less than 4.

As regards the method of stretching, rolling, tentering, tubular stretching, stretch blowing and, further, high draw ratio deep drawing or vacuum forming, for instance, can be employed. In the case of biaxial drawing, whichever desired of concurrent biaxial drawing and sequential biaxial drawing can be employed.

The stretching temperature is selected within the range of about 40° to 150° C.

After completion of stretching or orientation in the above manner, heat treatment for fixation is performed. The thermal fixation can be effected by any means well known in the art. Thus, for example, the stretched film mentioned above is maintained in a taut condition and heat-treated at 50° to 160° C, preferably 80° to 160° C., for about 2 to 600 seconds.

When necessary, the stretched film obtained may be subjected to cooling treatment, rolling treatment, printing treatment, dry lamination treatment, solution or melt coating treatment, bag making processing, deep draw processing, box making processing, tube making processing, splitting processing and so forth.

The films, sheets, containers or the like obtained in the above manner are useful as packaging materials for foods, drugs, industrial chemicals, agrochemicals and other various materials.

The resin composition of the invention can show much improved discoloration resistance and good self-purging property without sacrificing those flexural fatigue resistance, stretchability, shock resistance, flexibility, gas barrier property and other properties that are characteristic of the conventional EVOH-polyolefin resin compositions.

The following examples illustrate the invention in further detail. In the examples, "part(s)" and "%" are on the weight basis.

EXAMPLE 1

EVOH (A) [100 parts; ethylene content 32 mole percent, melt index 3 g/10 minutes (210° C., load 2,160 g), degree of saponification 99.5 mole percent] and 1.35 parts of magnesium acetate (D) were fed to a twin-screw extruder and heated and melted at 230° C.

A blend composed of 25 parts of maleic anhydride-modified very-low-density polyethylene (maleic anhydride moiety content 3%) (C) and 75 parts of very-low-density polyethylene (B) [(melt index 2.0 g/10 minutes (190° C., load 2,160 g), density 0.905 g/cm$^3$] was heated and melted at 230° C. in a single-screw extruder in advance and the melt was fed to the above twin-screw extruder through its side feed opening at a rate such that the weight ratio between the EVOH (A) and the polyolefin blend amounted to 60/40, kneaded in the twin-screw extruder to give a uniform mixture, and then extruded to give pellets. The amount of (D) relative to the carbonyl group in (C) was 1.86 equivalents. The amount of the carbonyl group per 100 g of [(B)+(C)] was 0.01 equivalent and the ratio A/[A+B+C] was 0.6.

Said pellets were then fed to a single-screw extruder fitted with a T die and molded into a film with a thickness of 30 μm.

The single-screw extruder was operated under the following film forming conditions:

| | |
|---|---|
| Screw inside diameter | 40 mm |

-continued

| | |
|---|---|
| L/D | 28 |
| T die | Coat hanger type |
| Die width | 45 mm |
| Extrusion temperature | C$_1$: 190° C., H: 220° C. |
| | C$_2$: 210° C., D$_1$: 220° C. |
| | C$_3$: 220° C., D$_2$: 220° C. |
| | C$_4$: 230° C. |

After 24 hours of continuous operation, the molding was discontinued and, 12 hours later, restarted.

EXAMPLE 2

EVOH (A) [100 parts; ethylene content 44 mole percent, melt index 12 g/10 minutes (210° C., load 2,160 g), degree of saponification 99.5 mole percent] and 1.3 parts of magnesium acetate (D) were fed to a twin-screw extruder and heated and melted at 230° C.

Pellets prepared from 30 parts of acrylic acid-modified very-low-density polyethylene (acrylic acid moiety content 3%) (C) and 70 parts of very-low-density polyethylene (B) [melt index 0.8g/10 minutes (190° C., load 2,160 g), density 0.905 g/cm$^3$] by melt kneading and pelletization were fed to the above twin-screw extruder through its side feed opening using a dosing feeder to give a weight ratio between the EVOH (A) and the polyolefin blend of 50/50, and the both were kneaded until uniform in said twin-screw extruder and then extruded to give pellets. The amount of (D) relative to the carbonyl group in (C) was 1.5 equivalents, the amount of the carbonyl group per 100 g of [(B)+(C)] was 0.01 equivalent, and the ratio A/[A+B+C] was 0.5.

Thereafter, film formation was performed in the same manner as in Example 1.

EXAMPLES 3 to 6

The compositions listed in Table 1 were prepared according to the formulations given in Table 2. In Examples 3 to 5, the procedure of Example 1 was followed and, in Example 6, the procedure of Example 2 was followed.

COMPARATIVE EXAMPLES 1 to 6

The compositions listed in Table 1 were prepared according to the formulations given in Table 2. In Comparative Examples 1 to 3, the procedure of Example 1 was followed and, in Comparative Examples 4 to 6, the procedure of Example 2 was followed.

The color tone of the film produced, the self-purging property and the state of material adhesion to the die are shown in Table 3 for each of the examples and comparative examples.

TABLE 1

| | EVOH (A) | | | Polyolefin resin (B) | | | Modified polyolefin resin (C) | | Alkali metal salt (D) |
|---|---|---|---|---|---|---|---|---|---|
| | Et (mole %) | SV (mole %) | MI (g/10 min.) | Type | MI (g/10 min.) | Density (g/cm$^3$) | Polyolefin resin | Modifier carboxylic acid** | |
| Example | | | | | | | | | |
| 1 | 32 | 99.5 | 3 | VLDPE | 2 | 0.905 | VLDPE (11)* | Maleic anhydride | Magnesium acetate |
| 2 | 44 | 99.5 | 12 | VLDPE | 2 | 0.905 | VLDPE (2.5) | Acrylic acid | Magnesium acetate |
| 3 | 29 | 99.5 | 8 | LLDPE | 2 | 0.918 | HDPE (4) | Maleic anhydride | Magnesium acetate |
| 4 | 29 | 99.5 | 8 | LLDPE | 2 | 0.918 | HDPE (4) | Maleic anhydride | Magnesium propionate |
| 5 | 38 | 99.5 | 25 | VLDPE | 1 | 0.905 | LLDPE (4) | Maleic anhydride | Magnesium acetate |
| 6 | 29 | 99.5 | 8 | VLDPE | 4 | 0.901 | LLDPE (4) | Maleic anhydride | Magnesium formate |
| Comparative Example | | | | | | | | | |
| 1 | 29 | 99.5 | 8 | VLDPE | 4 | 0.901 | — | — | — |
| 2 | 32 | 99.5 | 3 | LLDPE | 2 | 0.918 | LLDPE (4) | Maleic anhydride | — |
| 3 | 44 | 99.5 | 12 | VLDPE | 1 | 0.905 | HDPE (4) | Maleic anhydride | Magnesium acetate |
| 4 | 44 | 99.5 | 12 | VLDPE | 1 | 0.905 | HDPE (6) | Acrylic acid | Magnesium acetate |
| 5 | 29 | 99.5 | 8 | LLDPE | 2 | 0.918 | HDPE (4) | Maleic anhydride | — |
| 6 | 29 | 99.5 | 8 | LLDPE | 2 | 0.918 | HDPE (4) | Maleic anhydride | Magnesium propionate |

Notes to Table 1:
Et: ethylene;
SV: degree of saponification;
MI: melt index;
VLDPE: very-low-density polyethylene;
LLDPE: linear low-density polyethylene;
HDPE: high-density polyethylene.
*: The MI value is shown in the parentheses.
**: Addition level = 3% in (C).

TABLE 2

| | EVOH (A) Amount (parts) | Polyolefin resin (B) Amount (parts) | Modified polyolefin resin (C) Amount (parts) | Number of equivalents of carbonyl group per 100 g of [(B) + (C)] | Number of equivalents of (D) relative to carbonyl group in (C) |
|---|---|---|---|---|---|
| Example | | | | | |
| 1 | 60 | 30 | 10 | 0.01 | 1.86 |

TABLE 2-continued

|  | EVOH (A) Amount (parts) | Polyolefin resin (B) Amount (parts) | Modified polyolefin resin (C) Amount (parts) | Number of equivalents of carbonyl group per 100 g of [(B) + (C)] | Number of equivalents of (D) relative to carbonyl group in (C) |
|---|---|---|---|---|---|
| 2 | 50 | 35 | 15 | 0.01 | 1.5 |
| 3 | 55 | 36 | 9 | 0.008 | 1.8 |
| 4 | 70 | 26 | 4 | 0.005 | 0.7 |
| 5 | 40 | 20 | 40 | 0.02 | 3.5 |
| 6 | 60 | 28 | 12 | 0.017 | 1.0 |
| Comparative Example | | | | | |
| 1 | 60 | 40 | — | 0 | — |
| 2 | 55 | 36 | 9 | 0.07 | — |
| 3 | 50 | 35 | 15 | 0.01 | 0.1 |
| 4 | 70 | 26 | 4 | 0.01 | 8 |
| 5 | 55 | 36 | 9 | 0.008 | — |
| 6 | 80 | 17 | 3 | 0.006 | 1.3 |

TABLE 3

|  | Color tone of pellets from composition (Note 1) | Self-purging property (Note 2) | Adhesion to die | Shock resistance of film (Note 3) |
|---|---|---|---|---|
| Example | | | | |
| 1 | ○ | ○ | None | ○ |
| 2 | ○ | ○ | None | ○ |
| 3 | ○ | ○ | None | ○ |
| 4 | ○ | ○ | None | ○ |
| 5 | ○ | ○ | None | ○ |
| 6 | ○ | ○ | None | ○ |
| Comparative Example | | | | |
| 1 | ○ | Δ | Adhering matter, e.g. scorch etc. | x |
| 2 | ○ | x | Adhering matter, e.g. coat film etc. | ○ |
| 3 | ○ | x | Adhering matter, e.g. coat film etc. | ○ |
| 4 | x | x | None | Δ |
| 5 | ○ | x | Adhering matter, e.g. coat film etc. | ○ |
| 6 | ○ | ○ | None | x |

Methods of evaluation
Note 1: Evaluated according to the yellowness index (YI) as follows:
○ YI ≦ 15
x YI > 15
Note 2: The condition of the film after starting (restarting) the molding as follows:
○ Recovery from longitudinal streak within 30 minutes.
Δ Recovery from longitudinal streak in 30–60 minutes.
x No recovery from longitudinal streak even after the lapse of 60 minutes.
Note 3: Measured on a film impact tester (Rigaku Kogyo) at 20° C. and 65% RH using a ball having a diameter of 38 mm.
○ Not less than 12 kg · cm
Δ Not less than 8 kg · cm but less than 12 kg · cm
x Less than 8 kg · cm

What is claimed is:

1. A method of producing a resin composition comprising (A) a saponified ethylene-vinyl acetate copolymer having an ethylene content of 20 to 60 mole percent and a saponification degree of not less than 90 mole percent, (B) a polyolefin resin, (C) a carboxylic acid-modified polyolefin resin and (D) an alkaline earth metal salt of a lower fatty acid containing not more than 4 carbon atoms and characterized in: that the proportion of the saponified ethylene-vinyl acetate copolymer (A) relative to the total amount of the saponified ethylene-vinyl acetate copolymer (A) plus polyolefin resin (B) plus carboxylic acid-modified polyolefin resin (C) is 0.3 to 0.7 on the weight basis; that the composition contains the carbonyl group in an amount of 0.002 to 0.05 equivalent per 100 grams of the total of the polyolefin resin (B) plus carboxylic acid-modified polyolefin resin (C); and that the equivalent ratio between the alkaline earth metal salt of the lower fatty acid (D) and the carbonyl group in the carboxylic acid-modified polyolefin resin (C) is 0.5 to 5,
said method comprising mixing and melting a member belonging to the group (1) mentioned below and a member belonging to the group (2) mentioned below:
Group (1)
Member (1a): a mixed melt composed of the saponified ethylene-vinyl acetate copolymer (A) and the alkaline earth metal salt of the lower fatty acid (D);
Group (2)
Member (2a): a mixed melt composed of the polyolefin resin (B) and the carboxylic acid-modified polyolefin resin (C);
Member (2b): a mixed solid composed of the polyolefin resin (B) and the carboxylic acid-modified polyolefin resin (C);
wherein the member (2a) mixed melt is added to the member (1a) mixed melt by the side feed technique, for mixing and melting.

2. A method of producing a resin composition comprising (A) a saponified ethylene-vinyl acetate copolymer having an ethylene content of 20 to 60 mole percent and a saponification degree of not less than 90 mole percent, (B) a polyolefin resin, (C) a carboxylic acid-modified polyolefin resin and (D) an alkaline earth metal salt of a lower fatty acid containing not more than 4 carbon atoms and characterized in: that the proportion of the saponified ethylene-vinyl acetate copolymer (A) relative to the total amount of the saponified ethylene-vinyl acetate copolymer (A) plus polyolefin resin (B) plus carboxylic acid-modified polyolefin resin (C) is 0.3 to 0.7 on the weight basis; that the composition contains the carbonyl group in an amount of 0.002 to 0.05 equivalent per 100 grams of the total of the polyolefin resin (B) plus carboxylic acid-modified polyolefin resin (C); and that the equivalent ratio between the alkaline earth metal salt of the lower fatty acid (D) and the carbonyl group in the carboxylic acid-modified polyolefin resin (C) is 0.5 to 5, said method comprising mixing and melting a member belonging to the group (1) mentioned below and a member belonging to the group (2) mentioned below:

Group (1)
  Member (1a): a mixed melt composed of the saponified ethylene-vinyl acetate copolymer (A) and the alkaline earth metal salt of the lower fatty acid (D);

Group (2)
  Member (2a): a mixed melt composed of the polyolefin resin (B) and the carboxylic acid-modified polyolefin resin (C);
  Member (2b): a mixed solid composed of the polyolefin resin (B) and the carboxylic acid-modified polyolefin resin (C)

wherein the member (2b) mixed solid is added to the member (1a) mixed melt by the side feed technique, for mixing and melting.

* * * * *